Jan. 2, 1934.   F. CRAWFORD   1,941,739
FISHING REEL
Filed Sept. 28, 1931   2 Sheets-Sheet 2
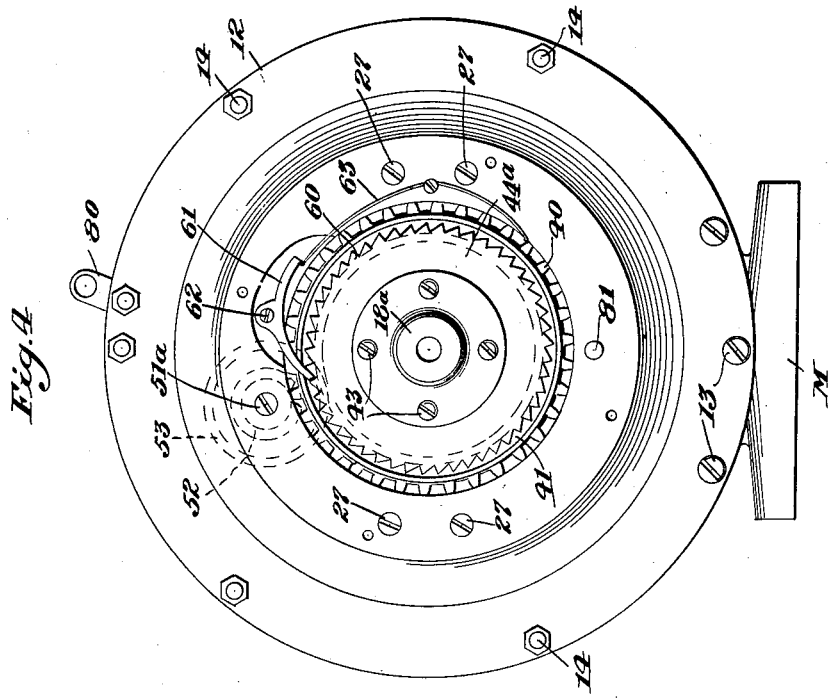
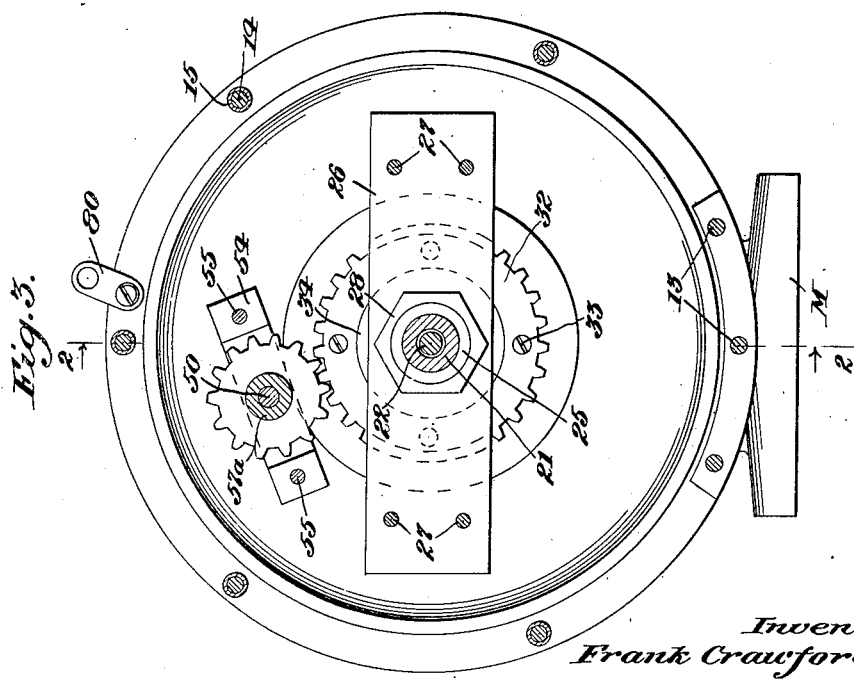
Inventor:
Frank Crawford,
by
Attys.

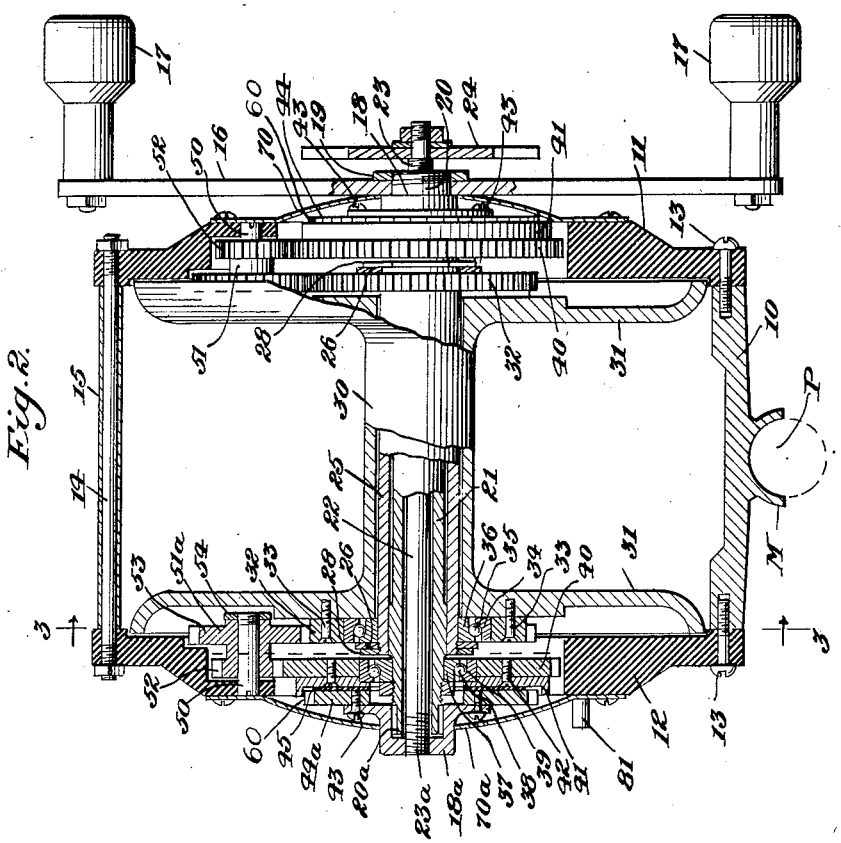
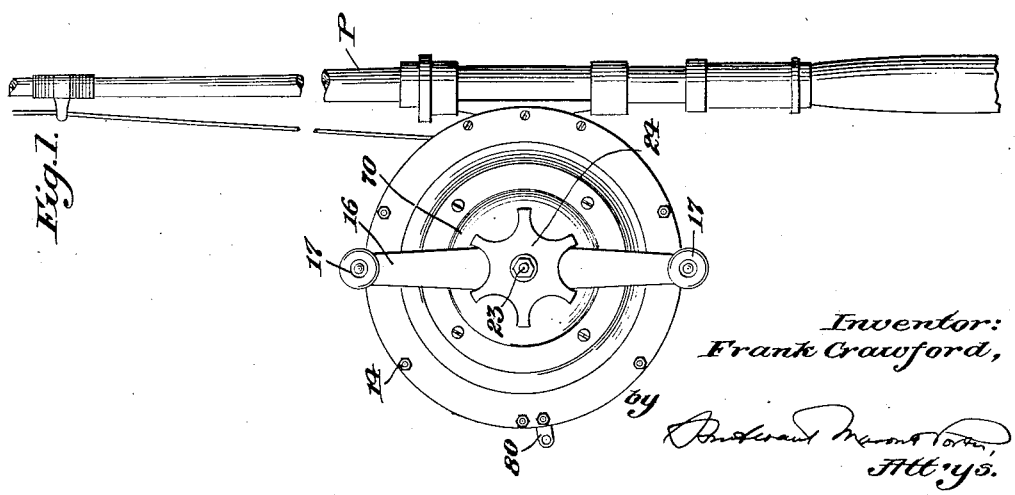

Patented Jan. 2, 1934

1,941,739

UNITED STATES PATENT OFFICE 1,941,739

FISHING REEL

Frank Crawford, Lihue, Territory of Hawaii

Application September 28, 1931
Serial No. 565,635

4 Claims. (Cl. 242—84.5)

This invention relates to improvements in fishing reels and more particularly concerns a reel having speed multiplying gears between the driving crank and the line bobbin.

One of the features of the present invention is a fishing reel in which driving means are provided at both ends of the bobbin for operation by the hand crank.

A further feature of the present invention is the provision of friction means for controlling the paying out of line from the bobbin, and particularly in which such means likewise serve for establishing a driving relationship between the hand crank and the bobbin.

Other features of the present invention appear in the course of the following specification and claims and upon the accompanying drawings, in which one illustrative form of construction of a reel according to the invention is set forth.

Fig. 1 is an end elevation of the reel in position upon a fishing rod.

Fig. 2 is a diametrical section through the same on a larger scale, substantially on line 2—2 of Fig. 3.

Fig. 3 is a section substantially on line 3—3 of Fig. 2.

Fig. 4 is an end elevation with the cover plate removed.

In the drawings, the reel is shown mounted upon a rod P by the mounting piece M which conforms interiorly to the rod and is formed integrally as a portion of the base 10 of the reel. The cheek plates 11, 12 of the reel are preferably formed of bakelite or similar water resistant material, and are secured by screws 13 to the base 10 and are held at proper spaced distances by the bolts 14 and sleeves 15, located at intervals along the periphery of the cheek plates. A hand crank arm 16 having the crank knobs 17 thereon is fixed on the hub 18 by a lock nut 19, this hub being hollow to receive the end 20 of the hollow shaft 21 which extends through the reel and has an end 20a outside the other cheek plate 12, about which is located a second hub 18a. The interior of the hubs 18, 18a and the exterior of the reduced portions 20, 20a are provided with interengaging means so that these members rotate together but may make relative axial movements with respect to one another. Inside the hollow shaft 21 is a spindle 22 having righthand and lefthand threads 23, 23a at the ends, which are engaged in similar threads in the hubs 18, 18a. The projecting end of the spindle 22 carries (Fig. 2) a star wheel 24 or similar device secured thereto for the manual rotation of the spindle 22 in either direction.

A hollow fixed shaft 25 surrounds and guides the shaft 21. This shaft 25 is supported at its ends by the base plates 26 which extend across openings in the cheek plates 11, 12 and are secured thereto by screws 27. Nuts 28 hold the hollow shafts 25 in fixed position.

Attached to the fixed hollow shaft 25 is the body 30 of the bobbin which has the usual side plates 31 and serves for receiving the fishing line which is secured thereto by any suitable means (not shown).

Annular gears 32 having external teeth are secured to the side pieces 31 of the bobbin by screws 33. Inside these gears are the ball races 34 for the ball bearings 35, operating on the inner ball races 36 mounted on the fixed hollow shaft 25. Hence, the bobbin is supported by ball bearings about the hollow fixed shaft 25.

Ball races 37 are mounted on the hollow shaft 21 to engage with the balls 38 which operate in the external ball races 39 upon which are secured the annular gear 40 and the friction plate 41, these latter members being connected together by screws 42. Fixed to the hubs 18, 18a by screws 43, are the friction members 44, 44a having fiber friction members 45 located therebetween, these members 45 being held within the peripheral flanges or lips of the friction members 41.

Mounted on the pivots 50 carried by the cheek plates 11, 12, are the gear sleeves 51, 51a having small gears 52 in mesh with the teeth on gears 40 and the large gears 53 in mesh with the teeth on the annular gears 32. The inner end of the pivots 50 are supported by bridges 54, which extend across cavities of the cheek plates intended for the reception of the gear members 52, 53 and are secured by screws 55 to the respective cheek plates.

Each of the friction members 44, 44a is provided at its periphery with ratchet teeth 60 (Fig. 4) for engagement by a corresponding holding pawl 61 mounted on a pivot screw 62 of the cheek plates 11 and 12 and provided with a spring 63 for holding it in engaging position.

Cover plates 70, 70a are externally fitted over the openings through the cheek plates 11, 12 to protect the gearing assembly, and in the form shown, the hubs 18, 18a project through central apertures of these plates.

It is preferred to provide clips 80 in the reel opposite the mounting M for engagement by the usual neck strap or yoke. This reel is particularly adapted for heavy duty as in power boat trolling. The rod is fixed in a holder attached to the boat. When a fish is hooked, the rod is removed from the holder and held by the fisherman; if a heavy fish is on the hook, the shoulder harness, including the neck strap or yoke, is connected to the clips 80 to assist the fisherman. An ordinary click may be provided on the gear 40 (not shown) and controlled by pin 81.

In operation, the star wheel 24 is rotated so that the hubs 18, 18a are backed away from the friction plates 41. The friction members 44, 44a are thus disengaged from driving relationship through the friction disks 45, with the friction members 41, and the bobbin 30. 31 is free for paying out line. As the bobbin turns, its annular gears 32 rotate the gears 52, 53 and therewith the gear 40. Since the bobbin and the gears 40 are supported on ball bearings, and there is a speed reduction ratio from the bobbin to the gear 40, very little drag is opposed to the free outward movement of the fishing line.

When it is desired to oppose a drag to the line, as when a fish has taken the hook, the star wheel 24 is turned so that the friction members 44, 44a establish a frictional relationship through the friction disks 45 with the members 41. The hollow shaft 21, keyed to the friction members 44, 44a is held against movement by the engagement of the pawls 61, with the ratchet teeth 60, and hence a friction brake is thus provided against the free outward movement of the fishing line. The amount of this braking effect may be regulated by adjusting the star wheel 24.

At any time that a friction is existing between members 44, 44a, and 41, through the friction disks 45, a turning movement of the knobs 17 and crank 16 causes a rotation of the hollow shaft 21 while the ratchet teeth 60 pass freely beneath the pawl 61, which successively takes up and holds the line thus reeled in, until a greater pull along the line causes a slippage in the friction members as described above.

When the crank arm 16 is rotated, the large diameter gear 40 drives the small diameter gear 52, and this in turn through the larger gear 53, drives the annular gear 32 which is of less diameter than the gear 40. In this way, an increase of speed is given to the bobbin over the angular speed of the crank arm 16, so that a long line may be rapidly wound in.

It will be noted from Fig. 1, that the fish line extends generally in the direction of the fish rod and that very small bending components of stress are imposed upon the pole while the line is being wound in or held by the friction device. Further, owing to the pawl 61 the knobs 17 are not rotated while the line is being paid out and, indeed, are only rotated manually, so that the star wheel 24 is always accessible without danger of injury from rotating knobs.

It is obvious that the invention may be modified in many ways without departing from the scope of the appended claims.

I claim:

1. A fishing reel comprising a frame, a rotatable bobbin, a hollow shaft in said bobbin and providing a bearing therefor, means on said frame for rotatatively supporting said hollow shaft at each end thereof, first clutch members located at and surrounding each end of said hollow shaft externally of said supporting means and connected to revolve therewith, means on the frame for preventing rotation of said first clutch members in one direction, a hand crank mounted on one said first clutch member whereby to rotate the same, a spindle in said hollow shaft having right and left threaded engagement with said first clutch members, means to rotate said spindle whereby to move said first clutch members toward and from one another, second clutch members rotatably mounted about said hollow shaft for co-operation with said first clutch members, and driving connections between said second clutch members and said bobbin.

2. A fishing reel comprising a frame, a bobbin, a hollow shaft in said bobbin, first clutch members located at and surrounding the ends of said hollow shaft and having interengaging driving connections therewith, a spindle in said hollow shaft having right and left threaded connections with said first clutch members whereby to move the same toward and from one another, a hand operable device for rotating said spindle, said first clutch member including a ratchet, a pawl on said frame engaging said ratchet to prevent reverse rotation of said first clutch members and said hollow shaft, second clutch members for co-operating with said first clutch members, and a gear train between said second clutch members and said bobbin including a large gear journaled on said hollow shaft and a small gear secured to said bobbin and gear members carried by said frame and connected together and in mesh with said large and small gears.

3. A fishing reel comprising a frame, a bobbin, a right and left threaded spindle, a hollow shaft surrounding said spindle, first clutch members having driving connections with said hollow shaft and axially movable therealong, threads on said first clutch members for engagement by the spindle threads so that said first clutch members are moved toward and from one another upon rotation of the spindle, second clutch members on said hollow shaft for cooperation with said first clutch members and each including a gear, annular gears fixed at each end of said bobbin, fixed pivots on said frame, and connected gears on each said pivot meshing with said driving gears and said annular gears.

4. In a fishing reel, a frame, a bobbin having annular gears fixed at each end thereof, a spindle having right and left threads at its ends, a hand operable device for rotating said spindle, a first hollow shaft surrounding said spindle, a pair of first clutch members at the ends of said hollow shaft and interengaging with said hollow shaft for axial movement thereon and to be carried in rotation therewith, a hand crank for rotating one of said first clutch members, said clutch members having threads engaging with the spindle threads so that the first clutch members are moved toward and from one another as the spindle is rotated, a second hollow shaft surrounding said first hollow shaft, bridge members on said frame for supporting said second hollow shaft, ball bearings at the ends of said bobbin for supporting the same for rotational movement around said second hollow shaft, a pair of second clutch members, ball bearings for supporting said second clutch members for rotation about the ends of said first hollow shaft, a gear of diameter larger than said annular gear fixed to said second clutch member, fixed pivots on said frame, and a pair of connected co-axial gears of which one is mounted on each of said frame pivots and meshes with said driving gear and said annular gear at the corresponding end of the bobbin, a ratchet on each said first clutch member, and pawls on said frame engaging with said ratchets for preventing movement of said first clutch members and said first hollow shaft in one direction.

FRANK CRAWFORD.